(12) United States Patent
Tomerlin et al.

(10) Patent No.: US 7,031,372 B2
(45) Date of Patent: Apr. 18, 2006

(54) MULTIPLE USER RECONFIGURABLE CDMA PROCESSOR

(75) Inventors: Andrew T. Tomerlin, Coral Springs, FL (US); Nicholas G. Cafaro, Coconut Creek, FL (US); Robert E. Stengel, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/964,114

(22) Filed: Oct. 13, 2004

(65) Prior Publication Data

US 2005/0063455 A1 Mar. 24, 2005

Related U.S. Application Data

(63) Continuation-in-part of application No. 10/441,333, filed on May 20, 2003, and a continuation-in-part of application No. 10/420,221, filed on Apr. 22, 2003.

(51) Int. Cl.
H04L 27/30 (2006.01)
(52) U.S. Cl. ............... 375/146; 375/150; 713/100; 713/321; 713/500; 714/739; 327/116; 327/119
(58) Field of Classification Search .............. 375/130, 375/140, 142, 150, 146, 354, 367; 714/738, 714/739, 744; 327/116, 119; 713/100, 321, 713/322, 500, 501
See application file for complete search history.

(56) References Cited

U.S. PATENT DOCUMENTS

| 5,774,703 | A | 6/1998 | Weiss et al. |
|---|---|---|---|
| 5,922,076 | A | 7/1999 | Garde |
| 5,963,069 | A | 10/1999 | Jefferson et al. |
| 6,091,760 | A * | 7/2000 | Giallorenzi et al. ........ 375/140 |
| 6,141,374 | A * | 10/2000 | Burns ........................ 375/152 |
| 6,147,531 | A | 11/2000 | McCall et al. |
| 6,259,283 | B1 * | 7/2001 | Nguyen ..................... 327/122 |
| 6,272,646 | B1 | 8/2001 | Rangasayee et al. |
| 6,282,627 | B1 | 8/2001 | Wong et al. |
| 6,480,045 | B1 | 11/2002 | Albean |
| 6,538,489 | B1 | 3/2003 | Nakano |
| 6,686,805 | B1 | 2/2004 | Cyrusian |
| 6,784,707 | B1 | 8/2004 | Kim et al. |
| 6,794,913 | B1 | 9/2004 | Stengel |
| 2003/0014682 | A1 | 1/2003 | Schmidt |
| 2003/0152181 | A1 | 8/2003 | Stengel et al. |

* cited by examiner

Primary Examiner—Dac V. Ha

(57) ABSTRACT

A circuit consistent with certain embodiments of the present invention has a source of N reference clock frequencies (230), where N is an integer greater than one. N frequency extender circuits (954) receive the N reference clock frequencies and generating N frequency extended output clock signals therefrom. A plurality of N seed slewers (958) produce N seed update values. A plurality of N seed registers (962) each receive one of the N seed update values and produce N seed masks therefrom. A plurality of N logic circuits (966) each receive one of the N seed masks and one of the N frequency extended output clock signals. Each of the N logic circuits (966) produce a pseudorandom sequence from the seed mask and the frequency extended output clock signal. This abstract is not to be considered limiting, since other embodiments may deviate from the features described in this abstract.

26 Claims, 8 Drawing Sheets

230

US 7,031,372 B2

MULTIPLE USER RECONFIGURABLE CDMA PROCESSOR

CROSS REFERENCE TO RELATED DOCUMENTS

This application is a continuation-in-part claiming priority benefit of U.S. patent application Ser. No. 10/441,333, filed May 20, 2003, and U.S. patent application Ser. No. 10/420,221, filed Apr. 22, 2003, which are hereby incorporated herein by reference.

FIELD OF THE INVENTION

This invention relates generally to the field of radio communication.

BACKGROUND

The air interface specification for many CDMA transceivers can be quite complex. Most currently available Digital Signal Processors (DSP) that perform to the air interface specification for CDMA systems either consume too much power, or they do not have enough correlation capacity for chip level processing. This is especially important for battery powered devices, since the power consumed directly relates to the battery life and frequency of charging or battery replacement. As the requirements for more and more processing power increase, this problem is compounded. This is also especially true for high frequencies of operation dictated by high data rates, such as those specified for the third generation (3G) and beyond for CDMA, where these issues present significant obstacles to designers. An additional obstacle is imposed if the transceiver is to process multiple users or multiple channels in parallel.

The field of reconfigurable processors is currently undergoing a period of rapid advances. Reconfigurable processors are circuit arrangements containing an array of circuits such as processors, arithmetic logic units (ALU), memory, interfaces, and other logic, digital and/or analog circuits that can be configured to operate in a desired manner under programmed control. Thus, the same circuit can be configured and reconfigured to operate in several ways depending upon the manner in which the circuit configuration is programmed. One popular application for such circuitry is in the field of digital signal processing (DSP). In this field, for example, a reconfigurable processor might operate as a first type of modem in a first environment and a second type of modem in a different environment.

In conventional reconfigurable processors, a single fixed clock is used to control the timing of internal functions. That is, the signal processing data path fabric operates at one fixed internal clock frequency. This can lead to high power consumption for certain DSP applications. This is almost always undesirable, but is particularly bothersome in battery-powered devices whose battery life is dependent upon minimizing excess power consumption.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
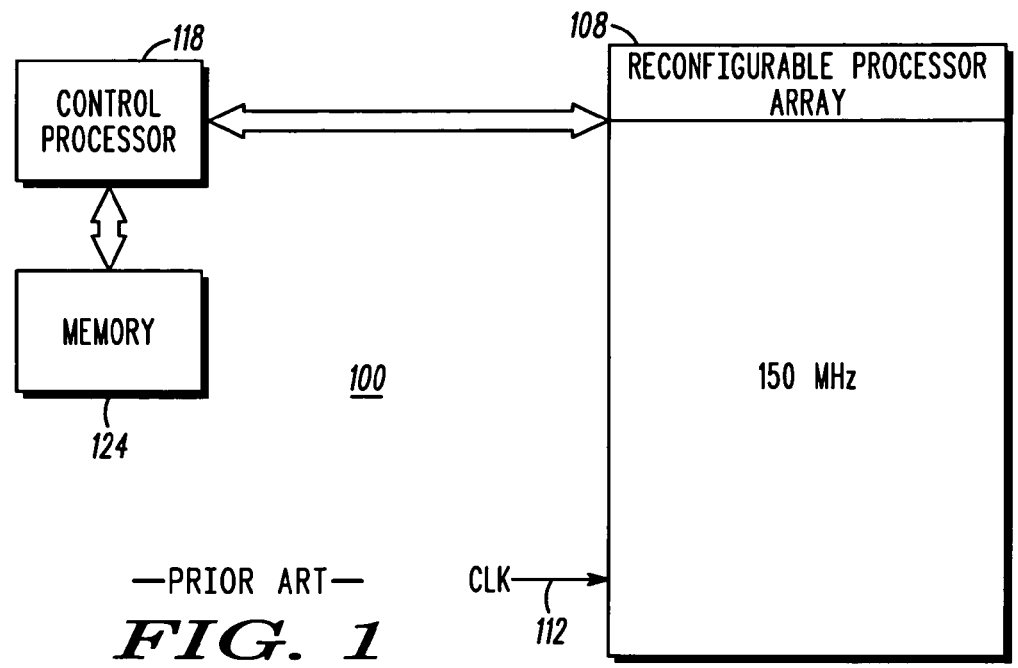
FIG. 1 is a conventional reconfigurable processor circuit.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/ dynamic load library and/or other sequence of instructions designed for execution on a computer system.

In certain embodiments consistent with the present invention, a concept referred to as "frequency extension" is utilized to facilitate high frequency processing while minimizing power consumption. This concept is used in conjunction with multiple clock signal generation, recursive sequence generation, a correlator circuit and a convolutional encoder operating under control of a control processor such as a reconfigurable processor, all of which may be useful in a low power consumption CDMA transceiver as well as in other applications. Integer variables K, L, M, N etc. are used and reused herein to denote an integer number of devices or signals. Generally speaking, there is no significance that should be attached to the particular variable name in any given usage. Since each of the subsystems used herein may be implemented in a number of ways, each will be dealt with under its own heading as follows:

Reconfigurable Processors

Reconfigurable processors are circuit arrangements containing an array of circuits such as processors, arithmetic logic units (ALU), memory, interfaces, and other logic, digital and/or analog circuits that can be configured to operate in a desired manner under programmed control. Turning now to FIG. 1, a conventional reconfigurable processor array circuit 100 is depicted. In this circuit 100 a reconfigurable processor array receives a single clock signal 112, (e.g., a 150 Mhz clock signal). This single clock signal drives all of the reconfigurable blocks of the reconfigurable processor array 108. In accordance with the conventional operation of such circuits, a control processor 118 (which is externally programmed) is used to control the specific configuration of the reconfigurable processor array 108 using instructions and data stored in a memory (e.g., a Random Access Memory) 124. As previously mentioned, with this arrangement, the entire reconfigurable processor array operates at a single clock frequency which may result in certain of the processing array operating at an unnecessarily high clock rate, thus consuming an unnecessarily large amount of power.

Figure 2:
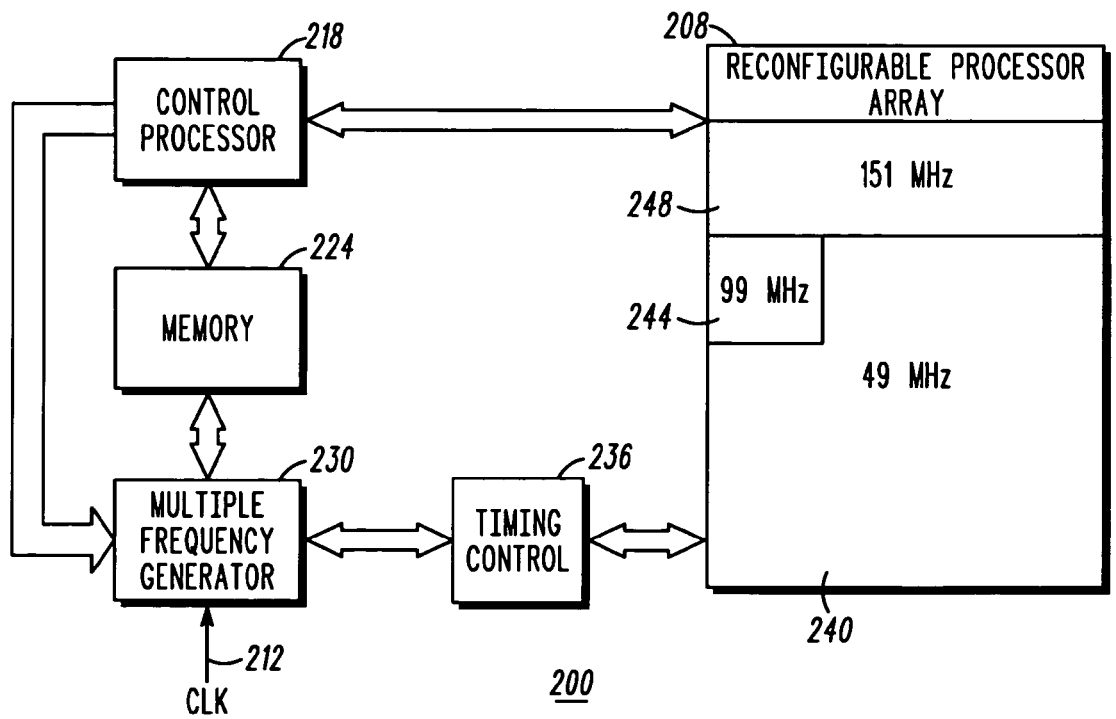
FIG. 2 is a reconfigurable processor circuit with multiple frequency generator capabilities consistent with certain embodiments of the present invention.

FIG. 2 depicts a reconfigurable processor circuit 200 consistent with certain embodiments of the present invention in which multiple clock frequencies can be programmed along with the programming of the reconfigurable processor array 208. This allows for the user to run the processing array 208 (also referred to as data path fabric, baseband fabric or fabric) under program control at multiple clock frequencies. Hence the user can define which portions of the processing array 208 can run at certain frequencies. This allows the user to run portions of the processor array 208 at lower clock frequencies, which leads to lower power consumption for applications such as certain digital signal processing (DSP) applications.

In this exemplary embodiment, a control processor 218 programs the reconfigurable processing array 208 to function in a desired manner under program control much like circuit 100. The programming for such control may be stored in memory 224. However, in the present embodiment, a clock signal 212 is supplied to a multiple reference clock generator circuit, which serves as a multiple frequency generator 230, that derives multiple reference clock frequencies from clock signal 212, also under program control from control processor 218 (which is again externally programmed). Multiple frequency generator 230 receives instructions from control processor 218 that instruct multiple frequency generator 230 to generate a selected collection of clock frequencies, e.g., by deriving such clock frequencies from the clock 212, as will be described later. These clock signals are then provided to a timing control circuit 236 (which in certain embodiments may be embodied as a part of control processor 218).

Timing control circuit 236 allocates and distributes the multiple clock frequencies to the various portions of the reconfigurable processing array 208 so that different portions of the reconfigurable processing array 208 can operate at different clock rates. For this exemplary embodiment, the reconfigurable processor array 208 is depicted as having been divided into three blocks (or collection of processing functions) that operate at three different clock rates. Block 240 operates at 50 Mhz, block 244 operates at 100 Mhz and block 248 operates at 150 Mhz. If this processor circuit 200 carries out a similar process as that of circuit 100, it is likely to require less power (assuming the multiple frequency generator and timing control functions use minimal additional power).

Again with reference to FIG. 2, the reconfigurable processor array 208 ("Fabric") may be made up of an array of Arithmetic Logic Unit (ALU) substructures denoted as Processing Units (PU's). Each PU is software reconfigurable executing a list of assembly instruction per software that is downloaded during a configuration process. Each PU can run at independent clock frequencies $f_{pu}$, where $F_{min} <= f_{pu} <= F_{max}$. The fabric can run at multiple frequencies, in other words the control processor 218 and timing control circuit 236 allocates and routes clocks to the fabric 208 to produce frequency reconfigurablity throughout the fabric. In the example shown, one software image runs one segment 248 of the fabric at 151 MHz, another segment 244 of the fabric at 99 Mhz and yet another segment 240 of the fabric at 49 MHz.

However, the fabric 208 and multiple frequency generator 212 can be reconfigured at will (even dynamically) by a new software download that configures a portion of the fabric 208 to run, for example, at 197.5 MHz, while another segment of the fabric runs at 99 MHz, and a final portion of the fabric 208 runs at 50 MHz. For example, a new software download could subdivide the fabric 208 into five new portions and run each portion at 252 MHz, 199 MHz, 150 MHz, 100 MHz, and 85 MHz respectively. Furthermore, each of the five new portions could be programmed to run at any frequency within a specified frequency range (dependant on the application). For example, portion one could operate within 249–260 MHz; portion two could operate within 188–201 MHz; portion three could operate within 136–151 MHz; portion four could operate within 88–105 MHz; and portion five could operate within 83–90 MHz. Each of the five new portions would have a new processing task dependant on functional parameters. This enables a powerful ability to reconfigure the frequency of operation of the reconfigurable processor array 208. Each ALU substructure (PU) in the fabric 208 can be reconfigured in both processing task and frequency. While the fabric 208 is described above as an array of ALU substructures acting as Processing Units, the fabric 208 could equivalently include a collection of any analog or digital blocks that utilize reference clocks.

The Integrated Control Processor 218 is for the control of the fabric 208, multiple frequency generator 230, timing control circuit 236 and off-chip communications. The control processor 218 controls new software downloads on the fabric.

The multiple frequency generator circuit 230 produces multiple, independent (or dependent) clock frequencies fl, . . . , fn to be used as clocking signals within the fabric 208. Any suitable multiple frequency generator 230, such as that shown in FIG. 3 to be described later, can be implemented as a low power solution for the multiple frequency generator. The timing control circuit 236 allocates which PU's in the fabric will run at different frequencies fl, . . . ,fn and routes the clocks through the fabric.

In addition to the ability to potentially reduce power consumption, certain embodiments consistent with the present invention also provide more DSP algorithm flexibility. Certain architectures consistent with the present invention allow the user to run fast and slow processing algorithms in a parallel fashion without having to allocate more silicon to faster algorithms. While the fabric 208 is described above as an array of ALU substructures acting as Processing Units, the fabric could equally well have a collection of any digital or analog circuit blocks using reference clocks. By way of example and not limitation, the processing fabric might have a collection of data converters whose reference clocks could be decreased (or shut off) when not processing data (i.e., clock gear shifting).

Thus, a reconfigurable processor circuit consistent with certain embodiments of the present invention has an array of configurable circuit blocks. A control processor configures a function of a plurality of the configurable circuit blocks. A multiple frequency generator generates a plurality of clock signals, each clock signal being configured in frequency by the control processor. A timing control circuit receives the plurality of clock signals, allocates the plurality of clock signals of different frequency among the plurality of circuit blocks and routes the clock signals to the circuit blocks.

A reconfigurable processor circuit consistent with certain other embodiments of the present invention has an array of configurable circuit blocks, wherein certain of the configurable circuit blocks comprise one of configurable arithmetic logic units and clocked digital logic circuits. A control processor configures a function of a plurality of the configurable circuit blocks. A memory stores program instructions used by the control processor. A multiple frequency generator receives a reference clock and synthesizes the plurality of clock signals, each clock signal being configured in frequency by the control processor. A timing control circuit receives the plurality of clock signals, allocates the plurality of clock signals of different frequency among the plurality of circuit blocks and routes the clock signals to the circuit blocks, wherein the timing control circuit operates under control of the control processor.

Multiple Frequency Generator

Figure 3:
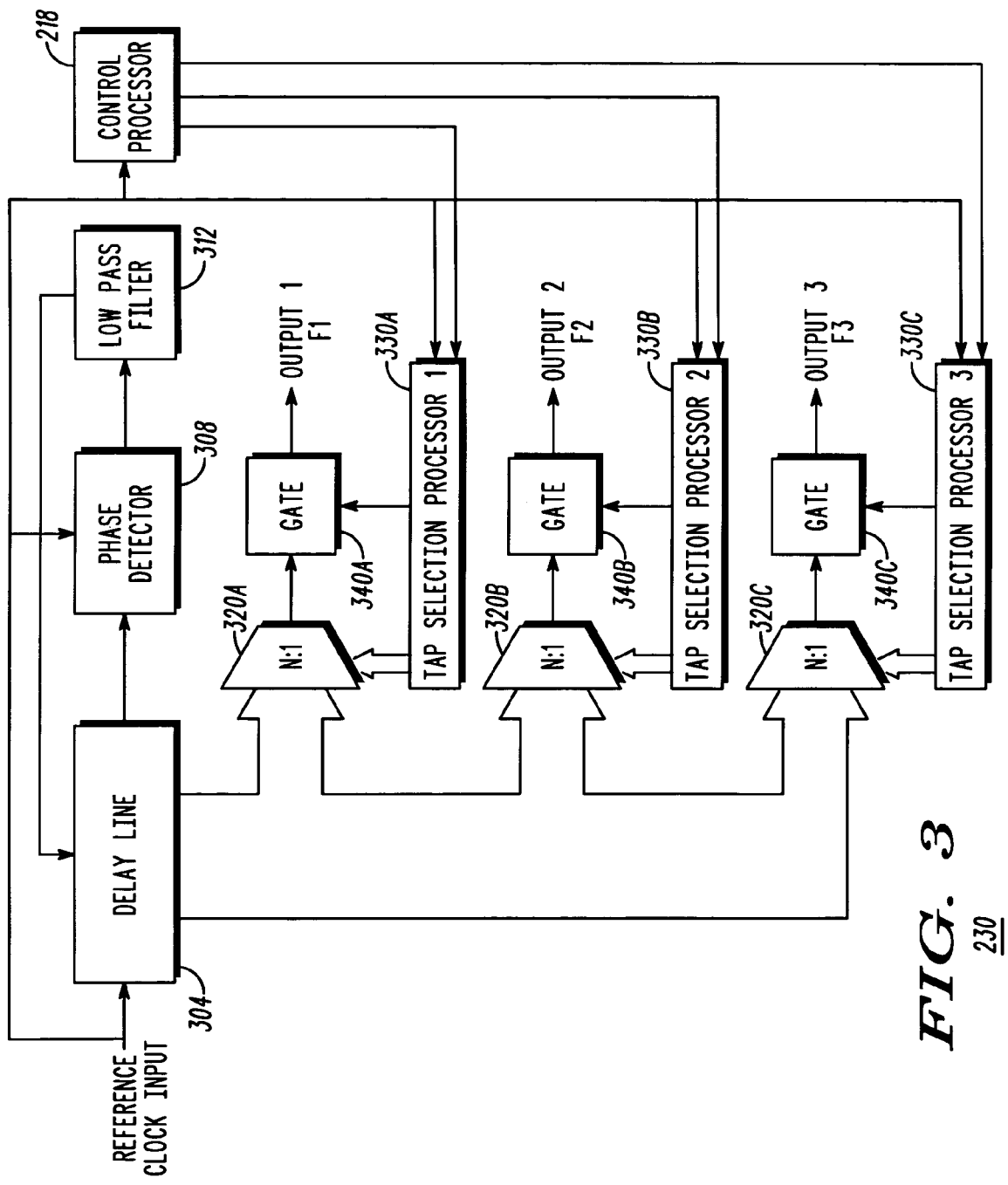
FIG. 3 illustrates an exemplary multiple frequency generator suitable for use in a reconfigurable processor circuit consistent with certain embodiments of the present invention.

In one embodiment, a multiple frequency generator circuit (embodied as multiple reference clock generator) 230 based on a delay locked loop can be used to generate multiple clock signals in the multiple frequency generator 230. FIG. 3 illustrates one technique, consistent with an embodiment of the present invention, of synthesizing multiple frequencies (in this example three frequencies are synthesized simultaneously) while reducing the current drain when compared with that of three separate synthesizers. In this example, a tapped delay line 304 receives a reference clock input signal and produces a delayed version thereof at an output. The delay line has N buffers in series, and each buffer has two or more inverters. Each buffer delays the reference clock signal by a fraction of its wavelength, which is locked by the delay lock loop (DLL). The output of the delay line and the reference clock are inputs into a phase detector 308 and a low pass filter 312. The output and reference clock inputs are compared at a phase detector 308 and the output of the phase detector is low pass filtered at 312 to produce a signal that controls the overall delay of the delay line 304.

The delay line 304's taps are provided as inputs to multiple multiplexers 320A, 320B and 320C. Under control of one or more tap selection processors such as 330A, 330B and 330C a combination of full clock cycles of the reference clock input plus a delayed clock from the delay line tap are used to generate each synthesized clock signal OUTPUT 1, OUTPUT 2, OUTPUT 3, which have a synthesized frequency that is less than the reference clock frequency. For example, when the delay line has 16 taps, a frequency of $16/17^{th}$ of the reference clock frequency can be generated by using one full clock cycle and a delayed clock cycle from a first tap of the delay line 304. The selection of the combination of full clock cycles of the reference clock input plus a delayed clock from the delay line tap is based on control commands issued from control processor 218. Thus, the control processor 218 controls an effective length of a delay line to generate the synthesized reference clock outputs, Hence, combinations of the delay signals from the delay line taps are appropriately selected to produce synthesized clock signals, based upon control commands issued from control processor 218. These synthesized clock signals may be gated by gating circuits 340A, 340B and 340C to produce output 1, output 2 and output 3 respectively representing three synthesized frequencies. Of course, more or fewer frequencies may be synthesized without departing from the invention.

In order to generate the multiple synthesized output signals, the same delay locked loop structure is shared, with the delay line 304's tap outputs being provided to multiple circuit arrangements for selection of the taps. Thus, any collection of three output frequencies can be generated using the arrangement of FIG. 3. Of course, the present a multiple frequency generator 230 is in no way limited to systems that produce three outputs. In general, two or more output selection circuits can be used to provide any desired number of output frequencies. Using CMOS or other high input impedance multiplexers, loading on the delay line is generally insignificant. However, driver circuitry can be used to boost the drive capacity of the delay line taps if necessary, with any delays introduced by the drivers appropriately accounted for. In light of this discussion, those skilled in the art will recognize that a single tap selection processor that by various means produces multiple tap addresses for the various multiplexers is entirely equivalent to the multiple tap selection processors shown. Thus, the illustration of multiple or single tap selection processors is simply a matter of convenience in illustration for any particular embodiment and should not be considered to be a limitation. By use of the above structure of circuit 230, for example, substantial current drain savings can be achieved over use of three separate DLL circuits. The above circuit arrangement 230 can thus be used to synthesize any desired set of frequencies (to within the accuracy of the DLL).

Thus, the reconfigurable processing array with variable timing control as described herein may be implemented as a software reconfigurable digital signal processor/processing array. The processing array is a matrix of ALU substructures (commonly called the data path in a conventional DSP) or a collection of digital blocks that are clocked by reference clocks. The circuit is frequency reconfigurable in the sense that the processing array 208 can run at multiple clock frequencies. Thus, certain embodiments consistent with this invention provide a more scalable and lower power consuming digital signal processor than those previously available. Certain embodiments consistent with the invention also permit the various clock speeds to be dynamically changed as deemed desirable to enhance performance while minimizing power consumption.

The multiple frequency generator 230 can be implemented as a low power solution to further reduce power consumption for this circuit. The output frequencies of the multiple frequency generator are digitally programmable and therefore conducive to a software reconfigurable application. Also, the multiple frequency generator 230 consistent with certain embodiments of the invention is able to change frequencies on a cycle-to-cycle basis because it does not incur lock time limitations found in traditional phase-locked loop (PLL) frequency synthesizers (however, this does not suggest that an embodiment consistent with the present invention cannot be based upon a PLL frequency synthesizer). Use of the multiple frequency generator 230 as depicted in FIG. 3 produces multiple independent outputs from a single reference clock without need for multiple phase locked loops.

In certain embodiments consistent with the present invention, power gating can be used to control the output clocks. For example, if six clock signals can be generated, but only four are to be used, the remaining two can be turned off by use of power gating in order to conserve power and inhibit leakage current. In other embodiments, the output could be turned off by use of a reset to inhibit the clock output.

Processor Configuration

Figure 4:
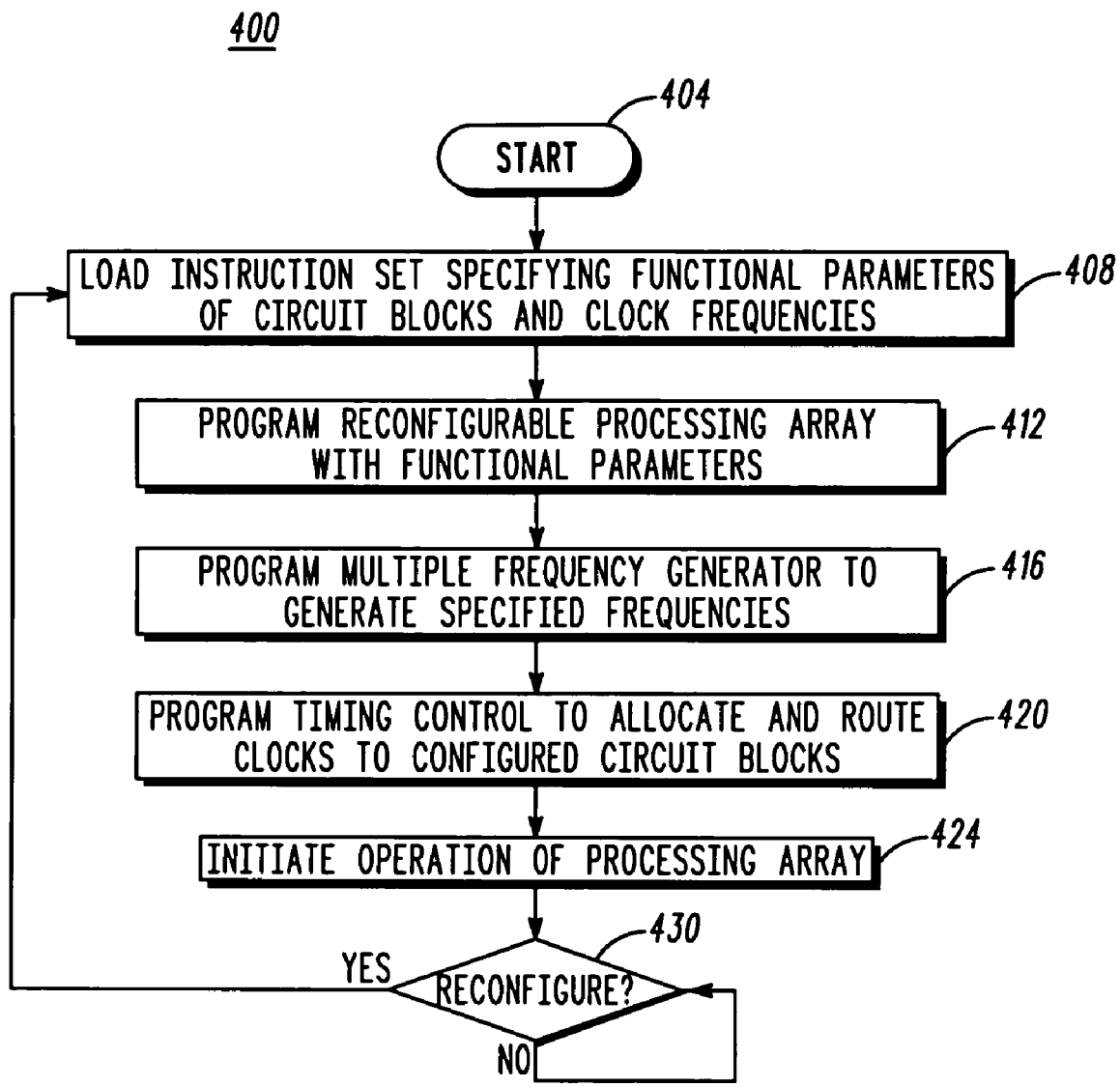
FIG. 4 depicts a process of configuring the reconfigurable processor circuit in a manner consistent with certain embodiments of the present invention.

One process for configuration of a reconfigurable processor circuit consistent with certain embodiments of the invention is depicted in flow chart form as process 400 of FIG. 4, starting at 404. At 408, an instruction set is loaded from an external source to the control processor 218. Such instructions specify the functional parameters of the configurable circuits forming a part of the fabric 208 as well as clock frequencies for each of the configurable circuit or group of circuits. The configurable processing array 208 is then programmed with the appropriate functional parameters to configure the array 208 as desired at 412. At 416, the multiple frequency generator is programmed to generate the specified clock frequencies from the reference clock signal 212. The timing control circuit 236 is then programmed to allocate and route clock signals to the various configurable circuits of fabric 208 at 420. At this point, the reconfigurable processor circuit 200 is fully programmed and configured and operation of the circuit 200 can be initiated at 424. This configuration remains functional until such time as a reconfiguration is initiated at 430, at which point, control returns to 408 to reconfigure the circuit 200.

While process 400 is depicted as a sequential process, the actual order of the programming functions 412, 416 and 420 can be rearranged as desired or carried out somewhat in parallel without departing from the invention. Such variations are considered fully equivalent and are contemplated by the present invention.

Thus, a method of configuring a reconfigurable processor circuit consistent with certain embodiments of the present invention involves receiving a set of configuration instructions the control instructions specifying functional parameters and clock frequency of a circuit block; configuring the circuit block with the functional parameters; and routing a clock signal having the clock frequency to the circuit block.

Frequency Extension

Figure 5:
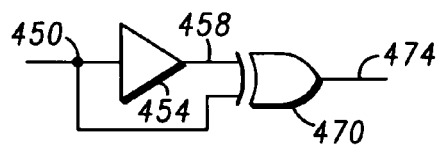
FIG. 5 is a schematic diagram of a pulse generator useful in the frequency extension circuitry consistent with certain embodiments of the present invention.
Figure 6:
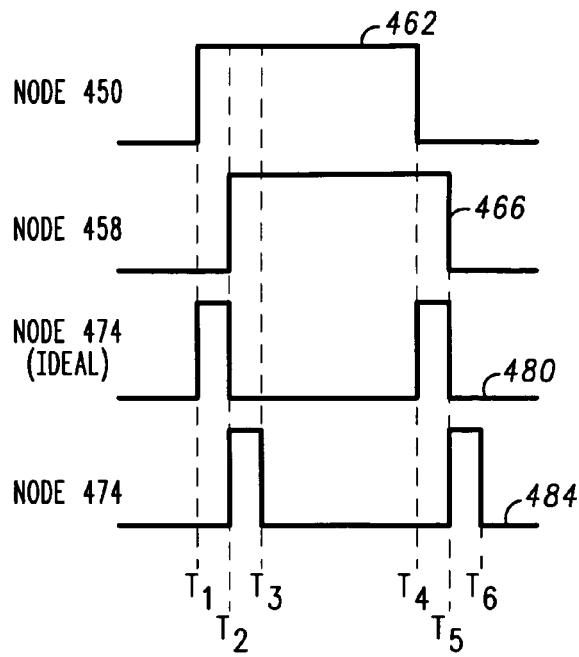
FIG. 6 is a timing diagram illustrating operation of the pulse generator of FIG. 5 and consistent with certain embodiments of the present invention.

Turning now to FIG. 5, viewed in conjunction with FIG. 6, an elementary process used in frequency extension is depicted in order to provide a clear understanding of the frequency extension process used herein. A reference clock input signal $F_{REF}$ is applied to the input node 450 of a buffer 454. A slightly delayed version of the input signal to buffer 454 emerges at the output node 458 of buffer 454. This is depicted by curves 462 and 466 of FIG. 6, with rising edges occurring at times $T_1$ and $T_2$ respectively, and falling edges occurring at times $T_4$ and $T_5$ respectively. These curves are idealized in that the rise time and fall time of the signals approach zero in all cases. The input signal at node 450 as well as the output signal at node 458 can be applied to an EXCLUSIVE OR gate (XOR) 470 to produce a pulse at its output (node 474) having duration corresponding to the delay associated with the buffer. If the delay of XOR gate 470 can be ignored, curve 480 would depict the output at node 474. This idealized output is shown as curve 480 with rising edge at times $T_1$ and $T_4$ respectively and falling edge times $T_2$ and $T_5$ respectively. Curve 484 depicts a more realistic output taking the assumption that the delay of XOR gate 18 is identical to the delay of buffer 454 so that the rising edges appear at approximately time $T_2$ and $T_5$ respectively and falling edge times appear at approximately times $T_3$ and $T_6$ respectively. If the reference clock has a period greater than the buffer delay, the above arrangement can be extended to produce a sequence of clock signals that extend the frequency of the reference clock substantially (i.e., frequency extension). This principle of frequency extension is put to use, for example, in the multiple clock generator circuit of FIG. 7.

Multiple Clock Generator

Figure 7:
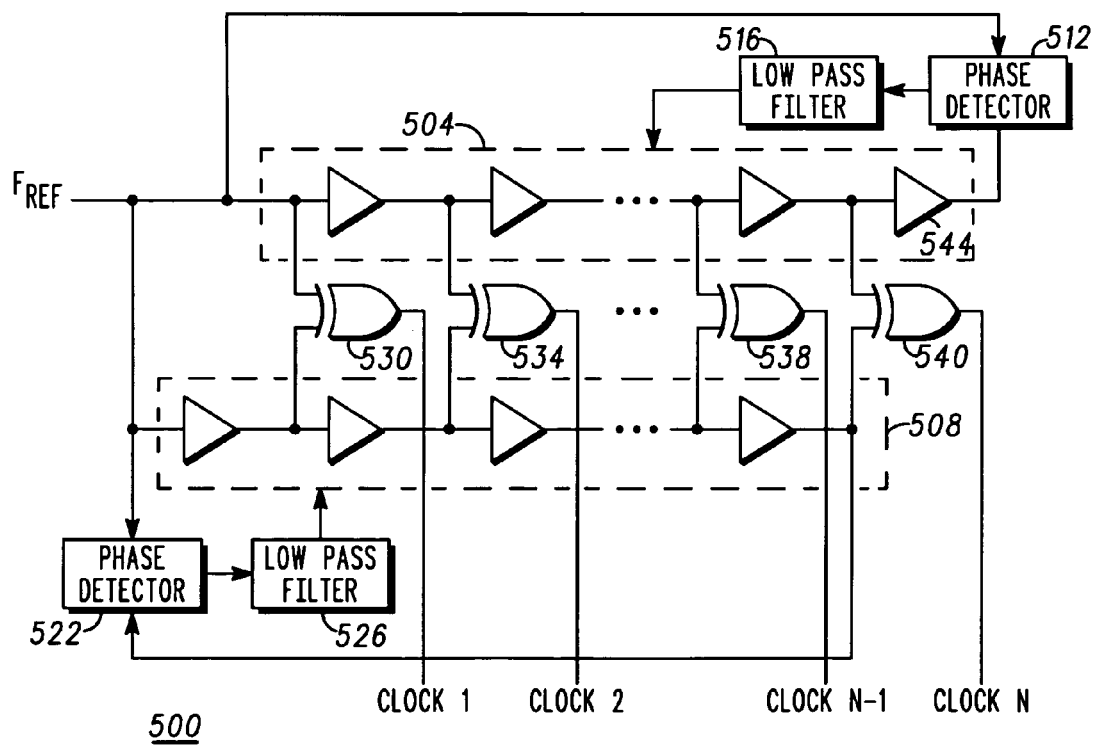
FIG. 7 is a schematic of a frequency extending multiple clock generator circuit consistent with certain embodiments of the present invention.

FIG. 7 depicts one implementation 500 of a frequency extending circuit that generates multiple clock outputs. This frequency extending circuit is referred to as frequency extending multiple clock generator circuit 500, and uses the above principle to extend the frequencies obtainable from a single lower frequency reference clock. Circuit 500 utilizes a pair of delay lines 504 and 508 configured as part of a pair of delay locked loops (DLL). Each of delay lines 504 and 508 are made up of a plurality of L series connected buffers that are locked to the reference clock $F_{REF}$. The locking is carried out using a delay locked loop arrangement. The final output of delay line 504 is compared with the input reference clock $F_{REF}$ at a phase detector 512. The phase detector 512 output is low-pass filtered at 516 and the output of filter 516 is used to control the overall delay of the delay line 504 in a feedback control system. In accordance with the present exemplary embodiment, the delay line 508 is locked in a similar manner to $F_{REF}$ in a DLL using phase detector 522 and low-pass filter 526.

Delay lines 504 and 508 are depicted to both be L stages in length with L buffers. Each of the buffers has an output and an input that are available at "taps" along the delay lines. In accordance with this exemplary embodiment, the input of the first delay element (buffer) of delay line 504 and the output of the first delay element of delay line 508 are added together at XOR gate 530 to produce a frequency extended output clock signal CLOCK 1 comprising a pulse occurring approximately one buffer delay after the rising edge of reference clock $F_{REF}$ (ignoring the delay of the XOR gate which can be readily taken into consideration as necessary or ignored if appropriate). In a similar manner, the input of the second delay element (buffer) of delay line 504 and the output of the second delay element of delay line 508 are added together at an XOR gate 534 to produce a frequency extended output clock signal CLOCK 2 in the form of a pulse occurring approximately two buffer delays after the rising edge of reference clock $F_{REF}$.

This sequence of processing continues until the input of the L-1 delay element (buffer) of delay line 504 and the output of the L-1 delay element of delay line 508 are added together at an XOR gate 538 to produce a frequency extended output clock signal CLOCK L-1 and the input of the Lth delay element (buffer) of delay line 504 and the output of the Lth delay element of delay line 508 are added together at an XOR gate 540 to produce a frequency extended output clock signal CLOCK L in the form of pulses occurring at approximately L-1 and L buffer delays after the rising edge of reference clock $F_{REF}$. In this manner, L clock signals can be produced at each rising and falling edge of the reference clock which collectively extend the frequency of the reference clock $F_{REF}$ by a factor of 2L. By use of DLL technology, the accuracy of the clock signals is maintained by the locking of the delays to the reference clock $F_{REF}$. Thus, L frequency extended output clock signals are produced by circuit 500 in this embodiment.

It should be noted that FIG. 7 is intended to depict delay lines 504 and 508 as being the same length (L buffers each). However, the last buffer 544 is not actually used for frequency extension in this exemplary embodiment. This buffer 544, however, may be included in order to facilitate locking the delay line 504 to $F_{REF}$ in the delay locked loop circuit (including phase detector 512 and low pass filter 516) so that the delays associated with the buffers of delay line 504 are locked to the same delay as the buffers of delay line 506. In other words, if both delay lines 504 and 506 have the same number L of delay elements (buffers) and both are locked to the same reference clock ($F_{REF}$), then each buffer will have approximately the same time delay associated therewith (approximately $1/(L*F_{REF})$). However, in other embodiments, delay line 504 may have one fewer delay elements than delay line 508 without departing from embodiments consistent with the present invention.

Figure 8:
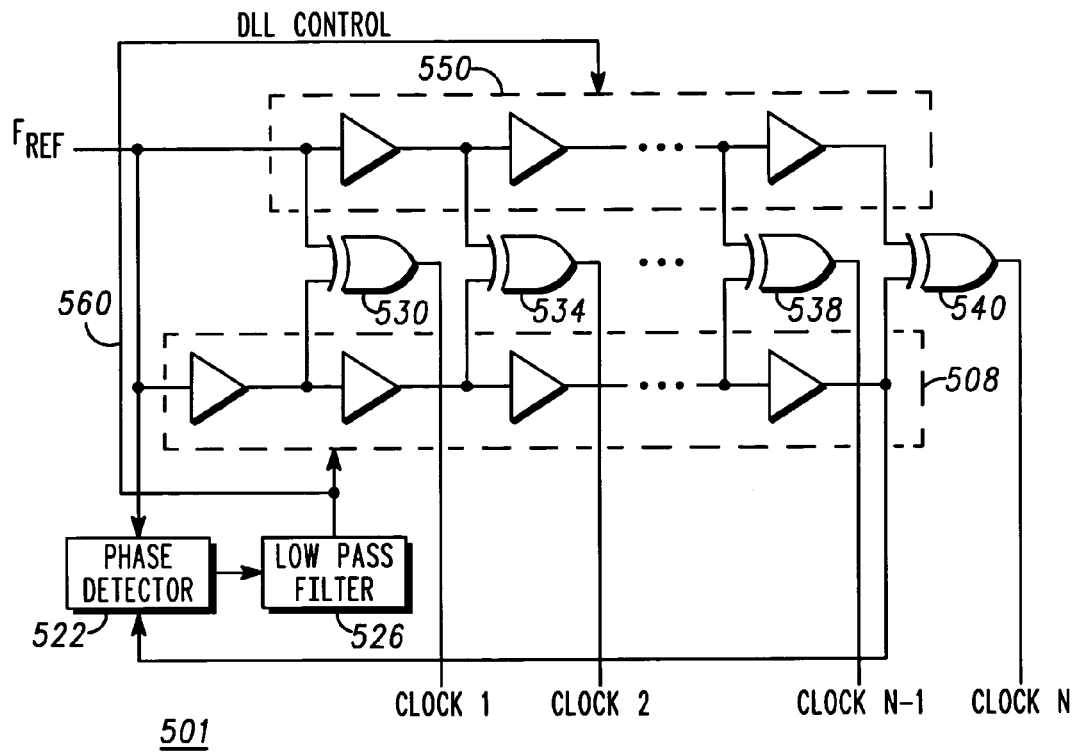
FIG. 8 is a schematic of an alternative embodiment of a frequency extending multiple clock generator circuit consistent with certain embodiments of the present invention.

The frequency extension concept can similarly be utilized in many other embodiments to produce an extension of the reference clock. FIG. 8 depicts a simplified version 501 of the frequency extending multiple clock generator of FIG. 7. In this example, like reference numbers designate identical components as those shown in FIG. 3. However, delay line 504 is replaced with delay line 550 which has L-1 delay elements. Owing to the different number of delay elements, delay line 550 is not locked to $F_{REF}$ by virtue of its own delay locked loop circuitry. Instead, delay line 550 receives the same control voltage 560 (or other control signal) from low pass filter 526 to control the overall delay of the delay line. If the buffer delay elements of delay line 550 are as nearly identical as possible to those of delay line 508, and receive the same control signal 560 (e.g., a voltage controlling a current source or charge pump associated with each delay element), then each delay element of delay line 550 will have a near identical delay to each delay element of delay line 508.

The frequency extender/multiple clock generator can also appropriately combine the taps of one delay buffer. If the inputs of the XOR gates 530, 534,538, and 540 are subsequent taps from the same delay line (for example delay line 508) then the outputs of the XOR gates would produce the same frequency extended clock pulse found in versions 500 and 501. In this embodiment, taps 0 and 1 from 508 provide inputs into XOR 530, taps 1 and 2 from 508 provide inputs into XOR 534, and so forth. Thus the frequency extender/multiple clock generator can be generalized to process taps from one or two delay lines.

To those skilled in the art, it is easily seen that XOR gates 530, 534, 538 and 540 can be replaced with other combinational logic to produce a high frequency clock pulse propagated at integer multiples of $L*F_{REF}$ across the delay line. For example, if XOR gates 530, 534, 538, and 540 are replaced with AND gates with one input inverted; then a clock pulse is formed with a rate of $L*F_{REF}$ propagating across the delay line. Thus, the frequency extension circuit produces output signals that are each integer multiples of $L*F_{REF}$ (where the multiples in the examples discussed are $1*L$ or $2*L$, but this should not be considered limiting).

Thus, the current embodiment of a frequency extender/multiple clock generator 500 uses the two offset delay lines as shown. The reference clock signal, $F_{REF}$, is fed into each delay line. The taps of each delay buffer are appropriately combined with taps from one or both delay lines with combinational logic (e.g. XOR'ed or AND'ed) to produce a high frequency clock pulse propagated at a multiple of $L*F_{REF}$ rate across the delay line.

In certain embodiments consistent with the present invention as illustrated, buffers are used for delay elements. These buffers may be, for example, fabricated from a pair of series connected CMOS (Complimentary Metal Oxide Semiconductor) inverters. The delay time of the delay line can be controlled by modifying the drive signal to current sources or charge pumps that supply current to the buffers. In other embodiments other types of delay elements may similarly be used without departing from the invention.

Thus, a frequency extension circuit, consistent with certain embodiments of the present invention has a first delay line having a plurality of taps. The delay line receives a reference clock at an input with a clock rate of $F_{REF}$. A second delay line also receives the reference clock at an input. A logic circuit combines signals from the delay line taps of the first delay line with signals from the delay line taps of the second and/or first delay line such that the $j^{th}$ tap of the first delay line is combined with the $j-1^{st}$ tap of the second and/or first delay line for each of a plurality of L taps in the first delay line to produce a collection of clock pulses having a combined clock rate of a multiple of $F_{REF}*L$. At least one of the delay lines can be locked to the reference clock using a delay locked loop.

This multiple clock generation mechanism gives rise to several interesting circuit arrangements that are particularly useful in a high frequency, low current drain transceiver. In particular, the present arrangement can be advantageously applied to CDMA transceivers. Any such frequency extending multiple clock generator such as 500 or 501 can be used to realize the circuits to follow. Such circuits are generally designated 500 hereinafter, without intent of limitation.

Recursive Sequence Generator

Figure 9:
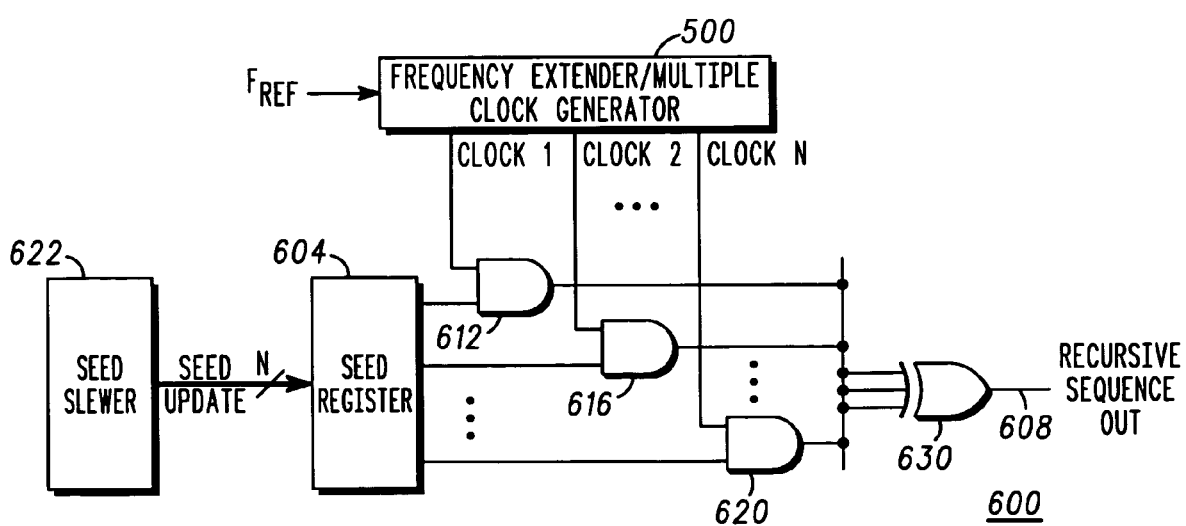
FIG. 9 is a recursive sequence generator consistent with certain embodiments of the present invention.

Recursive sequences and pseudorandom number (PN) sequences are used in CDMA transceivers. The above-described multiple clock generator and analogous circuits can be advantageously used in creation of such recursive sequences and PN sequences. FIG. 9 depicts an exemplary embodiment 600 of a recursive sequence generator using the above-described multiple clock generator 500 or 501 to generate clock signals CLOCK 1 through CLOCK L. In this example, both integers N and L are used for consistency in the description with other drawings. The clock generator 500 generates L clock signals, operating in conjunction with an N bit seed register 604. Thus, in this particular circuit example of recursive sequence generator 600, L=N. This embodiment is able to operate at high speeds with low current drain. A seed is stored in a seed register 604. The bits of the seed register can be referred to as a "seed mask". This seed is then combined with the clock signals CLOCK 1 through CLOCK L using suitable logic gates to produce a recursive sequence out at 608. In the present embodiment, the least significant bit of the seed is applied to one input of AND gate 612 while CLOCK 1 is applied to the other input of AND gate 612. Similarly, the next-to-least significant bit of the seed is applied to one input of AND gate 616 while CLOCK 2 is applied to the other input of AND gate 616. This pattern repeats until the most significant bit of the seed is applied to one input of AND gate 620 while CLOCK L is applied to the other input of AND gate 620. The outputs of AND gates 612, 616 through 620 are then combined in an EXCLUSIVE OR gate 630 to produce the output 608 of the recursive sequence generator. The seed register 604 is updated according to the particular mathematical relations defining the recursive sequence by a seed slewer 622 in a known manner. The seed register is updated at the reference clock frequency $F_{REF}$.

It should be noted that although shown as AND gates, 612, 616 and 620 could be generalized to other random combinational logic operation or combination of logic operations without loss of generality. Similarly, other logical operations could be substituted for the EXCLUSIVE OR function of gate 630 without departing from embodiments consistent with the invention. Once a recursive sequence is generated it can, by itself be considered a PN sequence, or it can be logically combined with other recursive sequences or PN sequences in a known manner to produce a PN sequence with a specified characteristic.

The frequency extender/multiple clock generator 500 or 501 thus uses the two offset delay lines (or one delay line) with the reference clock signal, $F_{REF}$, fed into each delay line (or the one delay line). The taps of each delay buffer are appropriately combined with combinational logic (e.g. XOR'ed or AND'ed) to produce a set of high frequency clock pulses propagated at a multiple of $L*F_{REF}$ rate across the delay line. These pulses can be used to clock data out of the seed register 604 and both pulses and seed are appropriately combined with combinational logic (e.g. AND'ed) and added together (e.g., at an XOR gate) to produce a recursive sequence at a multiple of $L*F_{REF}$ rate.

Thus, in accordance with certain embodiments consistent with the present invention, a recursive sequence generator has a frequency extended multiple clock generator receiving a reference clock input signal and generating a plurality of L extended clock signals CLOCK 1 through CLOCK L therefrom. A seed register stores an N bit seed number and a combinational logic circuit that combines the L extended clock signals with the N bit seed number to produce a recursive sequence as an output thereof. The seed register is updated as needed according to the mathematical relations defining the recursive sequence.

CDMA Receiver

Figure 10:
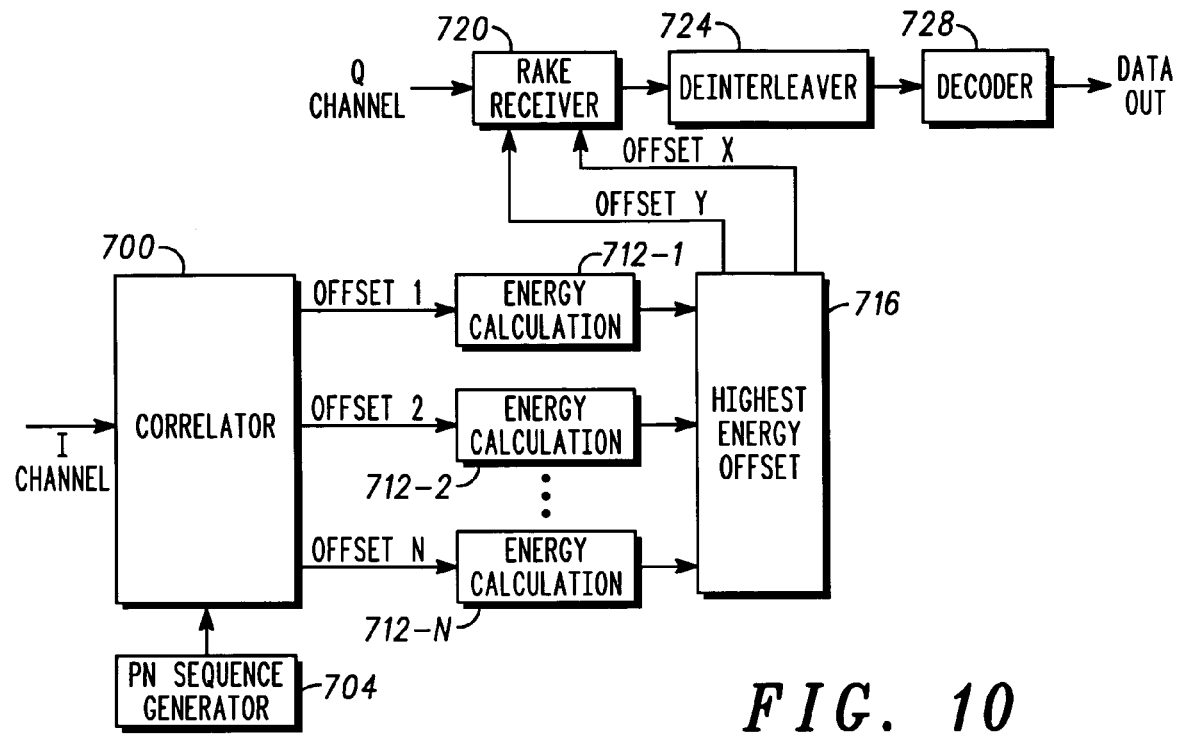
FIG. 10 is a block diagram of a portion of a CDMA receiver consistent with certain embodiments of the present invention.

An exemplary CDMA receiver is depicted in the block diagram of FIG. 10. The receiver portion of FIG. 10 depicts receipt of a demodulated in-phase (I) channel and a quadrant (Q) channel of information. The I channel is used to carry pilot information and is applied to a correlator 700. Correlator 700 takes the received complex baseband data and correlates the received data with a PN sequence generated by PN sequence generator 704 (e.g., made up of one or more recursive sequences generated by circuitry such as 600). The correlator 700, as will be described in greater detail later, can use a delay line in accordance with certain embodiments to implement a CDMA correlator using frequency extension to process baseband complex data and may do so at a very high rate (for example, >1 GHz). The correlator 700 outputs a set of time offset values (OFFSET 1 through OFFSET N). These time offset values are multiple time delayed versions of the same I channel data correlated with the PN sequence from PN sequence generator 704. The offset values, thus, represent multiple reflections of the input signals. The associated circuitry then determines which of the reflected values represents the two best quality signals, in this embodiment.

Each of the OFFSET values is passed to an energy calculator 712-1, 712-2 through 712-N. In certain embodiments, the energy calculator may be realized simply as an array of accumulators that operates to accumulate the input bits from each of the OFFSET values. These N parallel accumulators, accumulate the value of each offset to produce N energy estimates. From these accumulated values, or other energy estimate, the two offsets with the highest energy calculation value is determined at 716 and those two offsets (OFFSET X and OFFSET Y) are passed to a standard rake receiver 720 for use in processing incoming Q channel data. The rake receiver 720 operates to despread the two offsets and then combines them to create a received symbol. Rake receiver 720 may be a conventional rake receiver (for example, that takes the correlated data from the correlator 700, finds the highest energy peaks of that correlator data, then despreads the baseband data at the highest energy peaks to produce received encoded bits), or may be any other suitable receiver circuit. These encoded bits are passed to de-interleaver 724. The de-interleaver 724 reverses an interleaving process carried out in the transmitter side to reduce the effects of burst errors. The de-interleaved data are then passed to a decoder 728 (such as a hard decision or soft decision Viterbi decoder) and decodes the encoded bits to produce the received bit pattern.

Correlator Circuit

Figure 11:
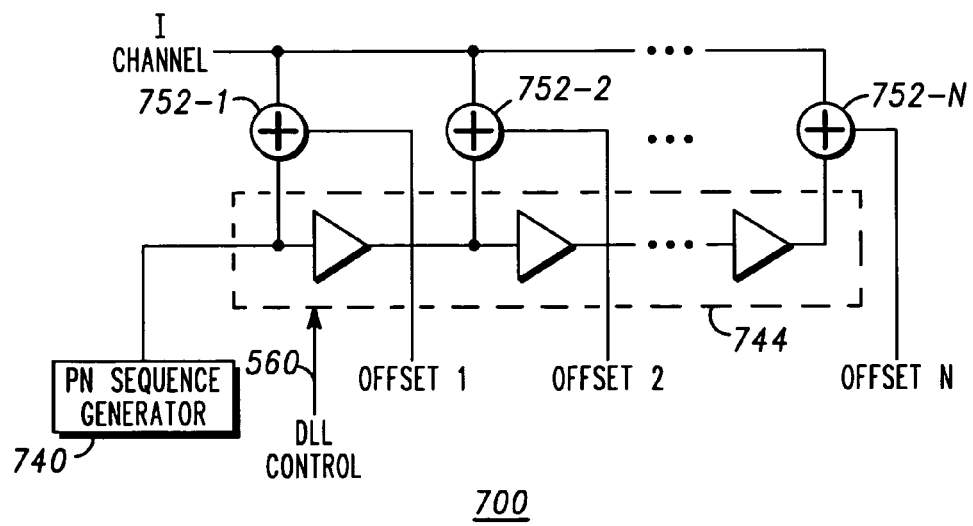
FIG. 11 is a circuit diagram of a correlator circuit as used in FIG. 10 and consistent with certain embodiments of the present invention.

In accordance with certain embodiments consistent with the present invention, a circuit architecture that uses frequency extension is used to perform a chip level correlation function. This architecture, in certain embodiments, allows for high frequency correlation (e.g., >1 GHz) while maintaining a low level of power drain. One embodiment of such architecture is depicted in FIG. 11 as correlator 700. This architecture provides a low power solution that uses a delay line to perform the chip level processing.

In this exemplary embodiment, a PN sequence generator 740 (e.g., of the form shown in FIG. 9 or combinations thereof), provides an input to a delay line 744 that is locked with the same delay line/delay lock loop control 560 found in the PN sequence generator 600. Hence the delay line 744 runs at the same rate as the PN sequence. Each input or output tap from the delay line is added to the I channel data using a plurality of adders/descramblers 752-1, 752-2 through 752-N (e.g., a logic gate such as an XOR gate that applies the PN sequence to the I channel data for demodulation) to produce the plurality of OFFSET values OFFSET 1 thorough OFFSET N. These OFFSET values are then supplied to their respective accumulators to provide an energy calculation as shown in FIG. 10.

Thus, a correlator circuit, consistent with certain embodiments of the present invention, has a delay line having an input and a plurality of N delay taps. A recursive sequence generator generates a recursive sequence and applies the recursive sequence to the input of the delay line to produce N delayed recursive sequences at the N delay taps of the delay line. A plurality of N logic circuits, each receive input data at a first input thereof and receive one of the N delayed recursive sequences at a second input thereof, wherein the N logic circuits each produce one of N offset outputs representing one of N possible time offset values.

This architecture allows for low power, high frequency correlation, advantageously using a delay line to assist in carrying out the correlation processing. The architecture uses delay line 744 to correlate complex baseband at high data rates and is capable of performing chip level processing at high rates (e.g., >1 GHz) in certain embodiments. The circuit configuration shown results in low power consumption, hence this solution is attractive for battery powered transceivers. This architecture can further provide an enabling technology for chip level processing on DSP's for infrastructure solutions and for ultra-wide band (UWB), to name but a few potential applications.

CDMA Transmitter

Figure 12:
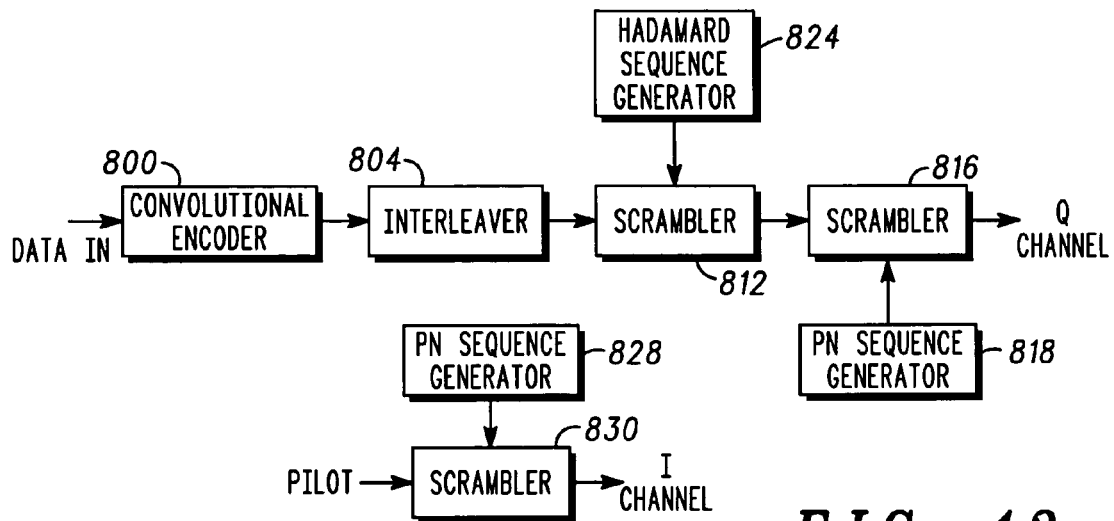
FIG. 12 is a block diagram of a portion of a CDMA transmitter consistent with certain embodiments of the present invention.

FIG. 12 depicts an exemplary CDMA transmitter. This exemplary transmitter receives data to be transmitted at a convolutional encoder 800. An exemplary convolutional encoder 800 will be described in greater detail later, but generally speaking encodes the input data to produce convolutionally encoded data. Convolutional encoders, per se, are well known devices, but the current convolutional encoder 800 utilizes frequency extension techniques as will be described.

The output of convolutional encoder 800 is provided to an interleaver 804 that interleaves data in a manner that makes the data more immune to burst errors and adds redundancy to the data. In certain embodiments, interleaving involves rearranging the data so that data bits that are normally adjacent to one another are scattered among multiple error correction blocks of data. Thus, data errors resulting from short bursts of noise or short fades will produce scattered one or two bit errors per block that can be corrected by block error correction or other error correction techniques.

A Hadamard sequence generator 824 generates a Hadamard sequence in a known manner that is combined with the interleaved data from interleaver 804 at a scrambler 812. A Hadamard sequence generator 824 generates one of a plurality of orthogonal sequences which are used to distinguish between each user in a particular communication system. The encoded data combined with the Hadamard sequence is then combined at scrambler 816 with a PN sequence generated by a PN sequence generator 818 made up of one or more recursive sequence generators 600, as previously discussed. The resulting data stream represents the Q channel data that can then be transmitted in a known manner.

The I channel is produced by generation of a pilot signal in any suitable known manner and combining the pilot with a PN sequence from another PN sequence generator 828 (or from PN sequence generator 818) at a scrambler 830. This pilot signal is used at the receiver as described above to characterize the channel for purposes of optimizing reception at the receiver.

Thus, the high frequency PN sequence generators and associated scramblers use frequency extension to produce PN sequences and spread the encoded data. The PN sequence generator uses a reference clock signal produced by the frequency extender/multiple clock generator such as 500 and produces PN sequences as described above. The scramblers take this PN sequence, the encoded data from the convolutional encoder 800, and control data ((1 data channel, 1 control channel)=(I,Q)) and produces the complex chips to be transmitted.

Convolutional Encoder

The convolutional encoder 800 described above is illustrated in greater detail in FIG. 13. This embodiment of the convolutional encoder 800 uses frequency extension concepts as described above to encode bits for transmission. The encoder receives a reference clock signal $F_{REF}$ at frequency extending multiple clock generator 500 and produces higher frequency clock pulses CLOCK 1, CLOCK 2, through CLOCK L in the same manner as described above. The convolutional encoder 800 uses a linear shift register 940 that receives the data bits to be transmitted. The high frequency clock pulse is appropriately combined with the data bits passing through the shift register 940 (state bits) using combinational logic to produce a time packed convolutionally encoded signal. This signal contains the encoded bits to be transmitted.

Figure 13:
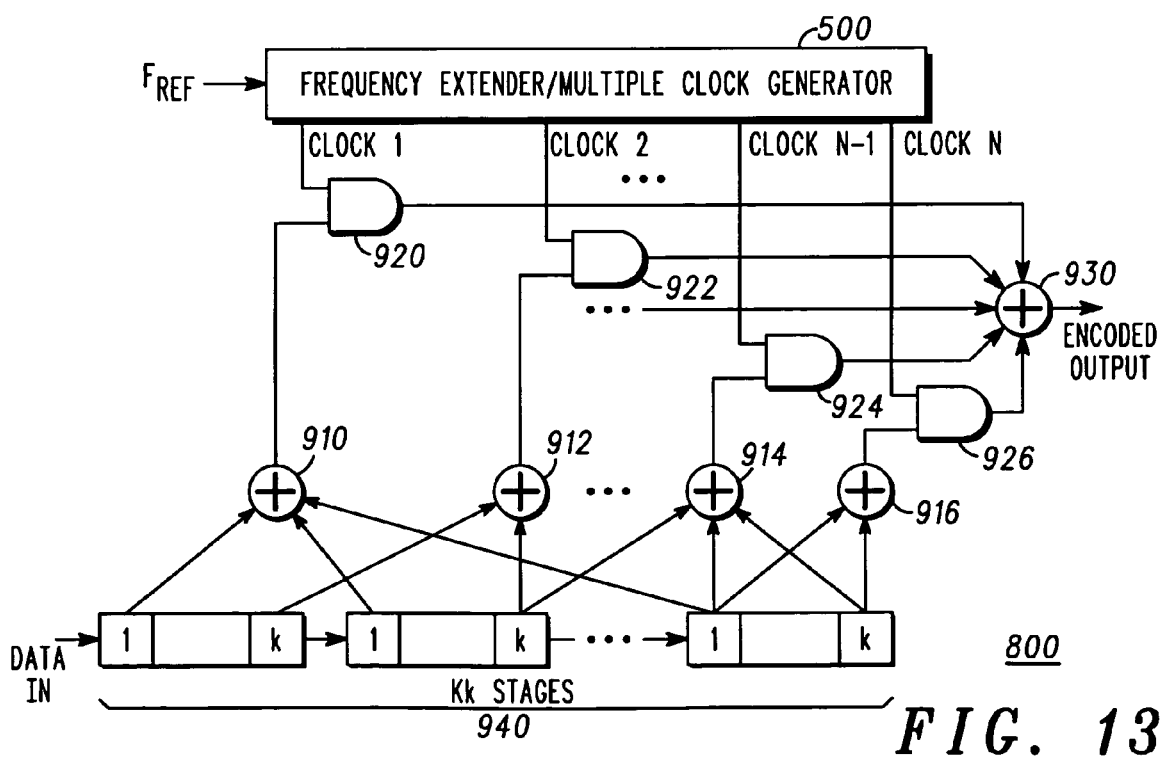
FIG. 13 is a circuit diagram of a convolutional encoder as used in FIG. 12 and consistent with certain embodiments of the present invention.

Referring to FIG. 13, the high frequency convolutional encoder contains a shift register 940 having K (k-bit) stages and L adders 910, 912 through 914, 916. The binary input data into the encoder is shifted into (and along) the shift register 450 k bits at a time. Hence the code rate is defined as R=k/L. The parameter K is defined as the constraint length. In general, the convolutional encoder 800 can produce the encoded output by combining the data bits passing through shift register 940 in an arbitrary manner defined by the convolutional code (air interface) specification at hand. This is depicted in FIG. 13 as arbitrary connections from the shift register cells to a plurality of adders 910, 912 through 914 and 916. The output of each of L adders (e.g., XOR gates) is then combined at AND gates 920, 922, through 924 and 926 respectively with clock signals CLOCK 1, CLOCK 2, through CLOCK L-1 and CLOCK L respectively. The outputs of AND gates 920, 922, through 924 and 926 are then combined at adder 930 to produce the encoded output. The encoded output is a time packed encoded sequence. For those skilled in the art, it is easily seen that this process of time packing an encoded bit sequence can be extended to "pack" several encoded output bits at one time. For example, the shift register 940 can be extended in length with more adders (910 through 916) to produce M*L code outputs at one time, where M>1. The multiple frequency generator 500 (240) can generate M*L clock pulses so that the output of the M*L adders is combined with the M*L clock pulses to generate M time packed code outputs.

Thus, a convolutional encoder, consistent with certain embodiments of the present invention has a frequency extended multiple clock generator receiving a reference clock input signal and generating a plurality of L extended clock signals CLOCK 1 through CLOCK L therefrom. A linear shift register receives input data bits to be transmitted, the shift register having P outputs at P memory cells in the linear shift register. A combinational logic circuit combines the L extended clock signals with the K outputs of the linear shift register to produce a convolutionally encoded data sequence as an output thereof.

Multiple User Reconfigurable CDMA Processor

Figure 14:
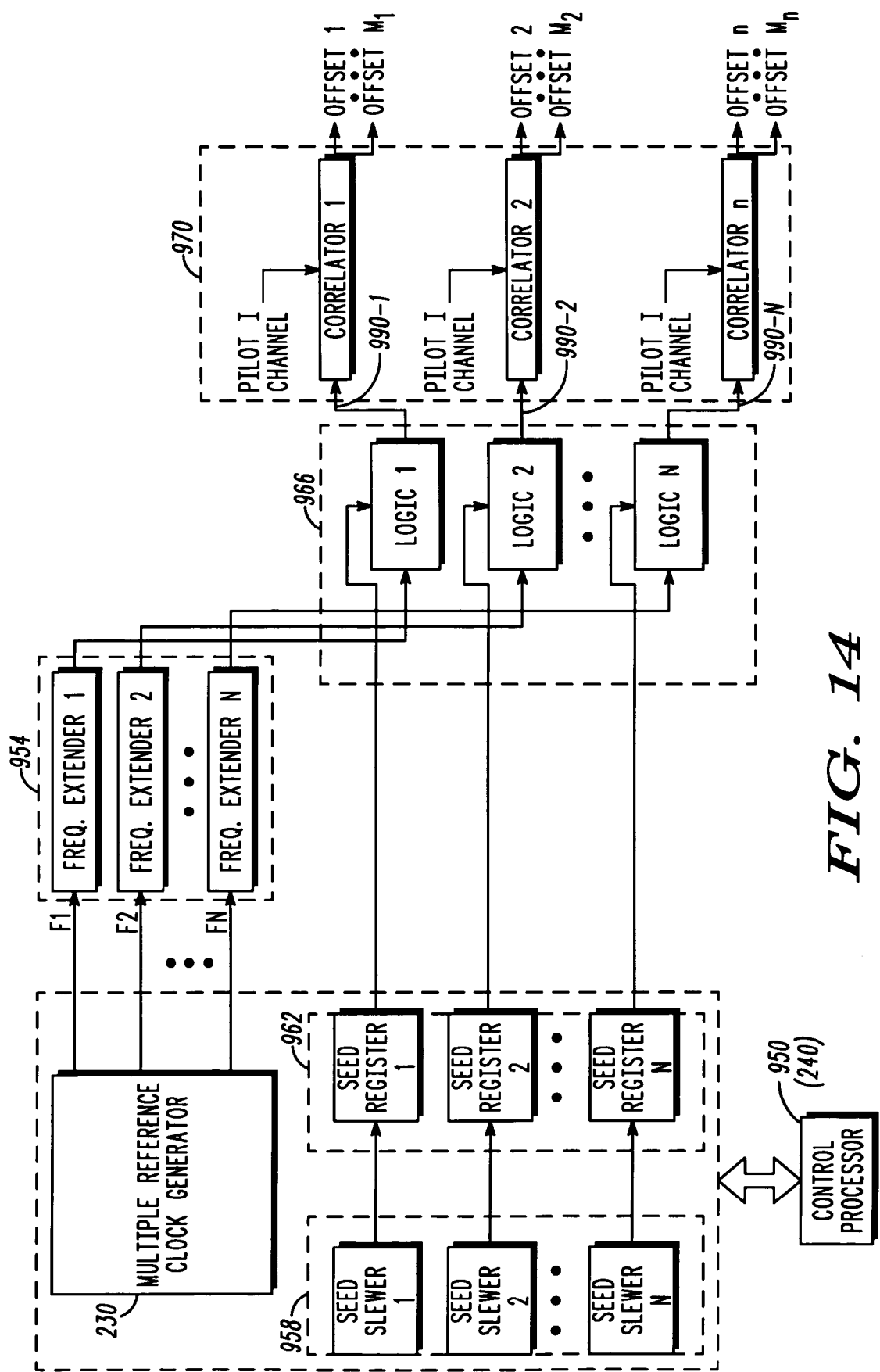
FIG. 14 is a block diagram of a multiple user reconfigurable CDMA processor consistent with certain embodiments of the present invention.

In accordance with certain embodiments consistent with the present invention, certain of the above components can be assembled to provide a multiple user reconfigurable CDMA processor which either permits multiple sequence generation on the same channel or multiple sequences for multiple channels. Such an arrangement is depicted by way of exemplary embodiment in FIG. 14. In this embodiment, a multiple frequency generator 230 can be used to generate multiple clock frequencies from a single reference input as previously described. Such multiple references from a single reference input can be determined by control processor 950, which may be embodied within a reconfigurable processor array such as 240, or may be any other suitable control processor without limitation. The multiple clock frequencies F1, F2 through FN can serve as multiple reference clock frequencies that can be extended by use of frequency extender circuits 954 such as those depicted as 500 or 501 in order to produce frequency extended output clock output clock signals.

A bank of seed slewers 958, which may be embodied within the same logic as multiple reference clock generator 240, produce a plurality of N seed updates that are updated at suitable clock rate to produce a corresponding plurality of N seed mask values from a bank of N seed registers 962. Each of the N seed masks from seed registers 962 are combined by one of N logic circuits 966 with an appropriate one of the N outputs of the frequency extender circuits of 954 (operating, for example in the same manner as gates 612, 616, through 620 and 630 of recursive sequence generator 600 of FIG. 9) to produce a N separate PN codes, one at each output of each of the N logic circuits of the bank of logic circuits 966. Each of these N-PN codes 990-1, 990-2 through 990-N can then be applied to a separate correlator within a bank of correlators 970. The PN codes are thus correlated with the Pilot I-channel information at the N correlators to produce M offset values. These M offset values can then be used in a multiple user reconfigurable CDMA processor which either permits multiple sequence generation and correlation on the same channel or multiple sequences and correlation for multiple channels.

Thus, a circuit consistent with certain embodiments of the present invention has a source of N reference clock frequencies, where N is an integer greater than one. N frequency extender circuits receive the N reference clock frequencies and generate N frequency extended output clock signals therefrom. A plurality of N seed slewers produces N seed update values. A plurality of N seed registers each receive one of the N seed update values and produce N seed masks therefrom. A plurality of N logic circuits each receive one of the N seed masks and one of the N frequency extended output clock signals. Each of the N logic circuits produces a pseudorandom sequence from the seed mask and the frequency extended output clock signal.

Certain embodiments further have a plurality of N correlators, with each correlator receiving one of the N pseudorandom sequences and correlating the pseudorandom sequence with a CDMA pilot I channel signal to produce a plurality of M offsets. The source of N reference clock frequencies can be implemented as a multiple frequency generator. A control processor can control various aspects of operation such as controlling the N frequencies produced by the multiple frequency generator 230. In certain embodiments, the control processor controls an effective length of a delay line used in the multiple frequency generator to generate the multiple reference clocks.

Conclusion

Thus, certain exemplary embodiments consistent with the invention as depicted in the circuitry described above uses the concept of frequency extension to carry out high speed processing with minimal current drain. For example, the concept of frequency extension can be used to extend a reference clock signal by speeding it up (for example taking a 500 MHZ clock signal and creating a 2 GHz clock signal). Frequency extension is accomplished using one or multiple delay lines and combinational logic to produce an extended (high) frequency output clock pulse. With this extended output clock signal (or signals), various signal processing functions can be carried out at a much higher rate. By way of example, the circuitry as described above can be used to realize a correlator to provide chip level CDMA processing. Similarly, frequency extension can be used to encode bits in a convolutional encoder (symbol level processing). Together these circuits can be used to realize substantial portions of a CDMA transceiver that uses frequency extension, with an associated low level of current drain.

By use of the current frequency extension concepts, descramblers and accumulators can run at a lower clock rate (e.g. reference clock rate) while architecture processes data at the extended frequency produced by the multiple clock generator, thus minimizing current drain. Moreover, the resulting circuitry, in certain embodiments, provides increased processing capability since the architecture correlates data at delay line rate (frequency extended rate). The multiple clock generator circuit can be used in multiple circuits to produce relatively low circuit complexity.

Embodiments consistent with the present invention can be utilized in digital signal processing chips to provide chip level processing, and may be useful in systems that requires chip level signal processing. Exemplary applications include, but are not limited to cellular telephone base stations (CDMA air interfaces) and cellular handsets (CDMA air interfaces).

Additionally, embodiments consistent with the present invention can be used to process multiple CDMA users in parallel, or to created the ability for a single user to use multiple codes. Additional applications will occur to those skilled in the art upon consideration of the present teachings.

The present invention, as described in certain exemplary embodiments herein, may be implemented using the programmed control processor executing programming instructions that are broadly described above, in flow chart form, that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations made without departing from the present invention. Such variations are contemplated and considered equivalent.

Circuit arrangements consistent with the present invention can be used for many digital signal processing functions such as cellular base stations for multiple or programmable air interfaces, cellular handsets for multiple or programmable air interfaces as well as air interfaces for other such wireless communication devices. Many other applications will occur to those skilled in the art upon consideration of this teaching.

While certain illustrative embodiments have been described, it is evident that many alternatives, modifications, permutations and variations will become apparent to those skilled in the art in light of the foregoing description.

What is claimed is:

1. A circuit, comprising:
  a source of N reference clock frequencies, where N is an integer greater than one;
  N frequency extender circuits receiving the N reference clock frequencies and generating N frequency extended output clock signals therefrom;

a plurality of N seed slewers producing N seed update values;
a plurality of N seed registers each one receiving one of the N seed update values and producing N seed masks therefrom; and
a plurality of N logic circuits each receiving one of the N seed masks and one of the N frequency extended output clock signals; each of the N logic circuits producing a pseudorandom sequence from the seed mask and the frequency extended output clock signal.

2. The circuit according to claim 1, further comprising a plurality of N correlators, each said correlator receiving one of the N pseudorandom sequences and correlating the pseudorandom sequence with a CDMA pilot I channel signal to produce a plurality of N offsets.

3. The circuit according to claim 1, wherein the source of N reference clock frequencies comprises a multiple frequency generator.

4. The circuit according to claim 3, further comprising a control processor controlling the N frequencies produced by the multiple frequency generator.

5. The circuit according to claim 3, wherein the control processor controls an effective length of a delay line used in the multiple frequency generator to generate the multiple reference clocks.

6. The circuit according to claim 3, wherein the control processor controls the generation of seed update values by the N seed slewers.

7. The circuit according to claim 1, further comprising a control processor controlling the N frequencies produced by the multiple frequency generator.

8. The circuit according to claim 7, wherein the control processor comprises a reconfigurable processor.

9. The circuit according to claim 8, wherein the source of N reference clock frequencies comprises a multiple frequency generator.

10. The circuit according to claim 8, wherein the reconfigurable processor controls the generation of seed update values by the N seed slewers.

11. The circuit according to claim 1, wherein the N frequency extended output clock signals comprise integer multiples of the N reference clock frequencies.

12. The circuit according to claim 1, wherein the N frequency extension circuits each comprise:
a first delay line having a plurality of taps, and receiving a reference clock at an input thereof, wherein the reference clock has a clock rate of $F_{REF}$;
a second delay line having a plurality of taps, and receiving the reference clock at an input thereof; and
a plurality of M EXCLUSIVE OR gates that combine signals from the delay line taps of the first delay line with signals from the delay line taps of the second and/or first delay line such that the $m^{th}$ tap of the first delay line is combined with the $m-1^{st}$ tap of at least one of the second and first delay line for each of a plurality of M taps in the first delay line,
wherein the EXCLUSIVED OR gates produce, as an output thereof, a collection of clock pulses having a clock rate of integer multiples of $F_{REF}*N$.

13. The circuit according to claim 12, wherein the plurality of M EXCLUSIVE OR gates each having a first input connected to the $m^{th}$ tap of the first delay line and having a second input connected to the $m-1^{st}$ tap of at least one of the second and first delay line for each of a plurality of M taps in the first delay line and producing at an output thereof one of M pulses that collectively form a collection of clock pulses having a clock rate of integer multiples of $F_{REF}*M$.

14. A circuit, comprising:
a multiple frequency generator serving as a source of N reference clock frequencies, where N is an integer greater than one;
N frequency extender circuits receiving the N reference clock frequencies and generating N frequency extended output clock signals therefrom;
a plurality of N seed slewers producing N seed update values;
a plurality of N seed registers each one receiving one of the N seed update values and producing N seed masks therefrom;
a plurality of N logic circuits each receiving one of the N seed masks and one of the N frequency extended output clock signals; each of the N logic circuits producing a pseudorandom sequence from the seed mask and the frequency extended output clock signal; and
a plurality of N correlators, each said correlator receiving one of the N pseudorandom sequences and correlating the pseudorandom sequence with a CDMA pilot I channel signal to produce a plurality of N offsets.

15. The circuit according to claim 14, further comprising a control processor controlling the N frequencies produced by the multiple frequency generator.

16. The circuit according to claim 14, wherein the N frequency extended output clock signals comprise integer multiples of the N reference clock frequencies.

17. The circuit according to claim 14, wherein the control processor controls the generation of seed update values by the N seed slewers.

18. The circuit according to claim 14, wherein the control processor comprises a reconfigurable processor.

19. The circuit according to claim 18, wherein each reconfigurable processor circuit, comprises
an array of configurable circuit blocks;
a control processor that configures a function of a plurality of the configurable circuit blocks;
the multiple reference clock generator; and
a timing control circuit that receives a plurality of clock signals from the multiple reference clock generator, allocates the plurality of clock signals of different frequency among the plurality of circuit blocks and routes the clock signals to the circuit blocks.

20. A circuit, comprising:
a multiple clock reference generator serving as a source of N reference clock frequencies, where N is an integer greater than one;
N frequency extender circuits receiving the N reference clock frequencies and generating N frequency extended output clock signals therefrom;
a plurality of N seed slewers producing N seed update values;
a plurality of N seed registers each one receiving one of the N seed update values and producing N seed masks therefrom;
a plurality of N logic circuits each receiving one of the N seed masks and one of the N frequency extended output clock signals; each of the N logic circuits producing a pseudorandom sequence from the seed mask and the frequency extended output clock signal;
a plurality of N correlators, each said correlator receiving one of the N pseudorandom sequences and correlating the pseudorandom sequence with a CDMA pilot I channel signal to produce a plurality of N offsets; and
a reconfigurable processor controlling the N frequencies produced by the multiple reference clock generator.

21. The circuit according to claim 20, wherein the N frequency extended output clock signals comprise integer multiples of the N reference clock frequencies.

22. The circuit according to claim 20, wherein the control processor controls the generation of seed update values by the N seed slewers.

23. A circuit, comprising:
   means for generating N reference clock frequencies, where N is an integer greater than one;
   means for receiving the N reference clock frequencies and generating N frequency extended output clock signals therefrom;
   means for generating a plurality of N seed masks from a plurality of N seed update values;
   means for receiving the N seed masks and the N frequency extended output clock signals and producing a pseudorandom sequence from each of the N seed masks and frequency extended output clock signals; and
   a plurality of N correlators, each said correlator receiving one of the N pseudorandom sequences and correlating the pseudorandom sequence with a CDMA pilot I channel signal to produce a plurality of N offsets.

24. The circuit according to claim 23, further comprising means for generating the plurality of N seed slewers to produce the N seed update values.

25. The circuit according to claim 23, further comprising a control processor controlling the N frequencies produced.

26. The circuit according to claim 25, wherein the control processor comprises a reconfigurable processor.

* * * * *